United States Patent
Wang et al.

(10) Patent No.: US 7,736,110 B2
(45) Date of Patent: Jun. 15, 2010

(54) WIRE STAPLE FOR ATTACHING METAL SHEETS

(75) Inventors: Shuxin Wang, Tianjin (CN); Pei-Chung Wang, Troy, MI (US); Lianhong Zhang, Tianjin (CN); Yuhong Liu, Tianjin (CN); Weijing Liu, Tianjin (CN); John D. Fickes, Brighton, MI (US)

(73) Assignees: GM Global Technology Operations, Inc, Detroit, MI (US); Tianjin University, Tainjin (CN)

( * ) Notice: Subject to any disclaimer, the term of this patent is extended or adjusted under 35 U.S.C. 154(b) by 409 days.

(21) Appl. No.: 11/960,895

(22) Filed: Dec. 20, 2007

(65) Prior Publication Data

US 2009/0162167 A1 Jun. 25, 2009

(51) Int. Cl.
*F16B 15/00* (2006.01)

(52) U.S. Cl. .................. 411/457; 411/471; 411/493; 411/920

(58) Field of Classification Search .......... 411/457, 411/471, 472, 493, 499, 920, 921
See application file for complete search history.

(56) References Cited

U.S. PATENT DOCUMENTS

| | | | | | |
|---|---|---|---|---|---|
| 1,542,281 | A | * | 6/1925 | Wendling | ............. 411/499 |
| 2,153,874 | A | * | 4/1939 | Posnack | ............. 29/432.1 |
| 2,261,734 | A | * | 11/1941 | Ricks et al. | ............. 36/34 R |
| 3,190,170 | A | * | 6/1965 | Baum et al. | ............. 411/448 |
| 3,925,955 | A | | 12/1975 | Becht | ............. 52/758 D |
| 4,637,194 | A | * | 1/1987 | Knowles | ............. 52/690 |
| 4,697,045 | A | | 9/1987 | Beatty | |

FOREIGN PATENT DOCUMENTS

| KR | 10-2002-0048123 A | 6/2002 |
|---|---|---|
| KR | 20-0373974 Y1 | 1/2005 |
| KR | 20-0380016 Y1 | 3/2005 |

\* cited by examiner

*Primary Examiner*—Flemming Saether

(57) ABSTRACT

A staple for attaching together first and second metal sheets is made of a length of round wire bent at the ends to form spaced apart depending metal legs, each having a metal piercing point at the end thereof adapted to pierce completely through the first sheet and at least partially through the second sheet and also adapted to spread the legs further apart during the piercing to a spread position in which the legs are anchored within the metal sheets and thereby attach the metal sheets together. The metal piercing points each having an outside bevel surface on the outside of the leg, an inside bevel surface on the inside of the leg, and a blunt end surface between the inside and outside bevel surfaces.

3 Claims, 2 Drawing Sheets

$d = 0.25 - 2\,mm$
$x = 45° - 75°$
$y = 60° - 90°$
$a_1/d = 0.15 - 0.5$
$a_2/d = 0.15 - 0.4$

//  WIRE STAPLE FOR ATTACHING METAL SHEETS

FIELD OF THE INVENTION

The present invention relates to a metal staple for attaching metal sheets together, and more particularly a staple having metal piercing points at the end of the legs to facilitate piercing the legs into the sheets and the spreading apart of the legs to attach the sheets together.

BACKGROUND OF THE INVENTION

It is well known to drive a staple through a pair of sheet materials in order to attach the sheet materials together. For example, staples are commonly used to attach pieces of paper together. In the manufacturing industries, it is known to attach together first and second sheet metal materials using a staple. A typical staple is made of a length of wire and has spaced apart legs that are driven through one of the sheets and then on through the other sheet. The legs may have a special configuration at the end thereof to facilitate the piercing and attaching operation. However, it would be desirable to provide further improvements in the design of such staples, particularly for the attachment together of steel and aluminum sheet materials.

SUMMARY OF THE INVENTION

A staple for attaching together first and second metal sheets is made of a length of round wire bent at the ends to form spaced apart depending metal legs. Each leg has a metal piercing point at the end thereof adapted to pierce completely through the first sheet and at least partially through the second sheet, and adapted to spread the legs further apart during the piercing to a spread apart position in which the legs are anchored within the metal sheets and thereby attach the metal sheets together. The metal piercing points each have an outside bevel surface on the outside of the leg, an inside bevel surface on the inside of the leg, and a blunt end surface between the inside and outside bevel surfaces.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 1:
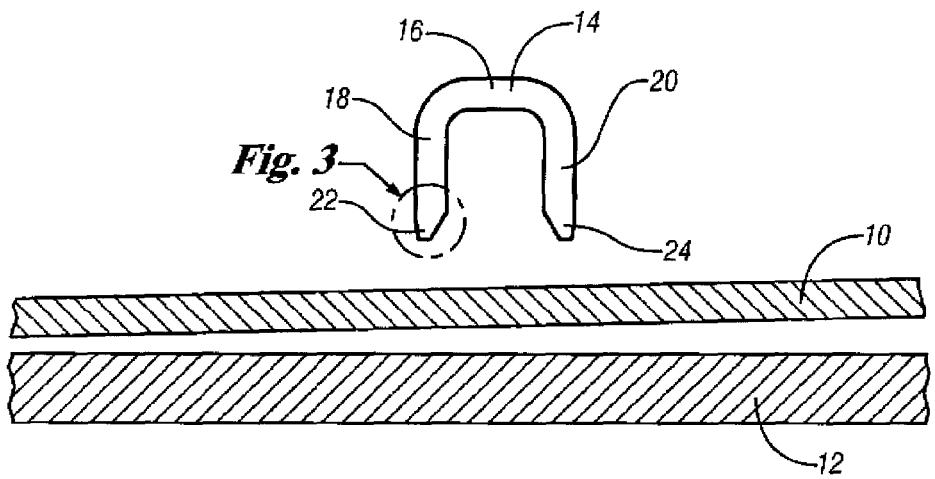
FIG. 1 is an elevation view showing a staple according to the invention poised for piercing a pair of stacked metal sheets.

Referring to FIG. 1, a pair of metal sheets are stacked together and include a top sheet 10 and a bottom sheet 12. The metal sheets 10 and 12 may be of steel, aluminum, magnesium, or any alloy thereof. The metal sheets may be galvanized or have other surface coatings thereon. If desired, a layer of adhesive or sealer can be placed between the sheets 10 and 12.

As seen in FIG. 1, a staple 14 if provided for attaching together the sheets 10 and 12. Staple 14 is made of a length of round wire and includes a central strap portion 16, a downwardly bent left hand leg 18 and a downwardly bent leg 20. The legs 18 and 20 are spaced apart by the length of the central strap 16. The legs 18 and 20 are generally parallel with each other. Leg 18 has a metal piercing point 22 at the end thereof and the leg 20 has a metal piercing point 24 at the end thereof. The staple wire may be SAE 1065 steel, cold rolled and heat treated to high strength spring temper, with a hardness of Rockwell C 40-50.

Figure 2:
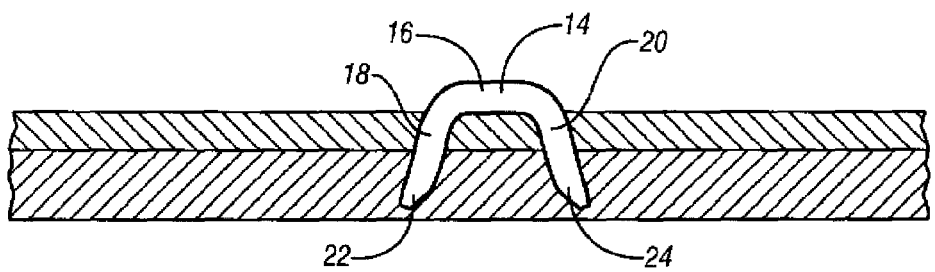
FIG. 2 is a view similar to FIG. 1 but showing the staple having pierced the sheets to attach the sheets together.

Referring to FIG. 2, it is seen that the staple 14 has been forced onto the top metal sheet 10 so that the legs 18 and 20 have pierced completely through the top metal sheet 10 and partway into the lower metal sheet 12. During the piercing operation, the legs 18 and 20 have been spread apart from one another. The staple 14 is retained in place by the friction between the legs 18 and 20 and the metal sheets 10 and 12, and also by the mechanical interference that results from the spread-apart position of the legs 18 and 20. Accordingly, the presence of the staple, with its legs 18 and 20 embedded within the metal sheets 10 and 12, will function to attach the sheets 10 and 12 together as shown in FIG. 2.

Figure 3:
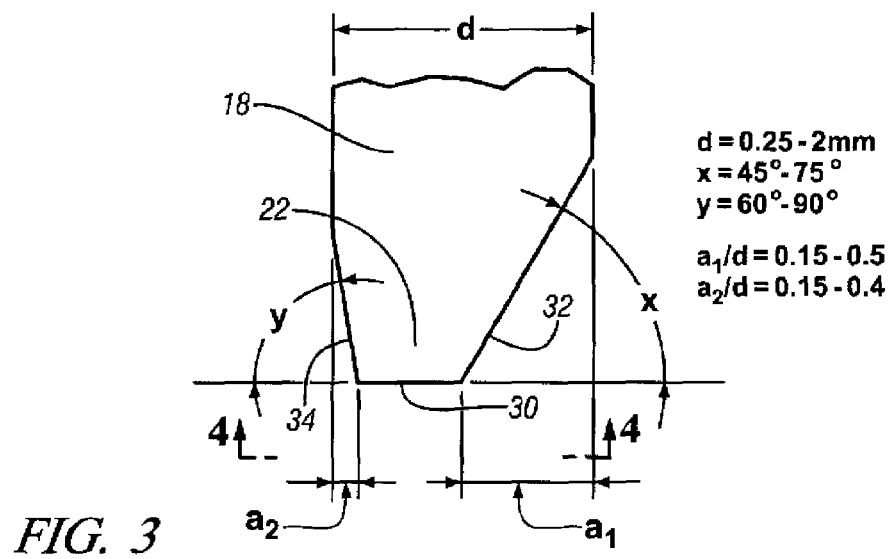
FIG. 3 is an enlarged fragmentary view of FIG. 1 showing the metal piercing point of one of the legs of the staple.
Figure 4:
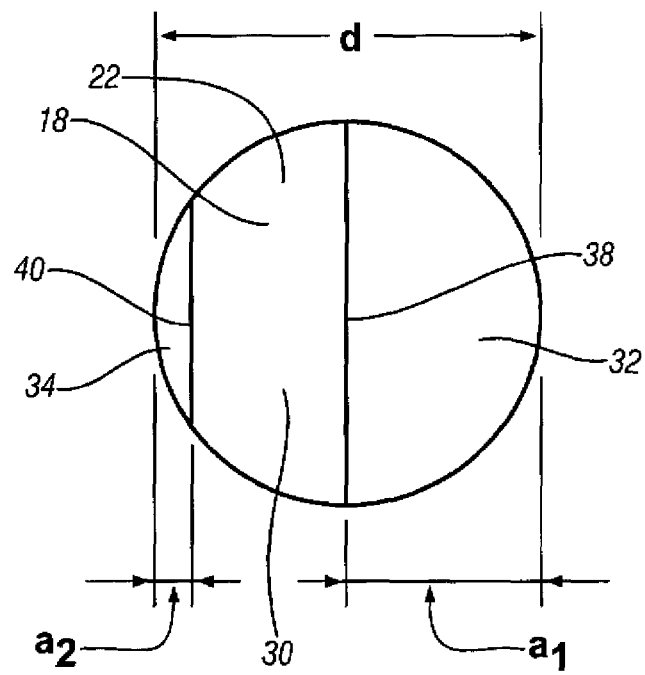
FIG. 4 is a view taken in the direction of arrows 4-4 of FIG. 3 showing the bottom of the metal piercing point of FIG. 3.

Referring to FIG. 3, it is seen that the metal piercing point 22 of the leg 18 is specially shaped and dimensioned to provide optimum insertion of the staple 14 and retention of the legs 18 and 20 within the metal sheets 10 and 12. In particular, the wire from which the staple 14 is made is round and has a diameter in the range of 0.25 mm to 2.0 mm. The metal piercing point 22 has a blunt end surface 30, a beveled inside surface 32, and a beveled outside surface 34. The angle "x" of the inside beveled surface 32 is in the range of 45-75 degrees as measured from the plane of the blunt end surface 30. The angle "y" of the outside beveled surface 34 is in the range of 60-90 degrees as measured from the plane of the blunt end 30. As seen in FIGS. 3 and 4, the intersection of the inside beveled surface 32 with the blunt end surface 30 forms a chord indicated at 38 in FIG. 4. This chord 38 is located at a distance "a1" from the inside surface of the leg 18. The dimension "a1" is in the range of 0.15 to 0.5 of the diameter "d" of the wire. As seen in FIGS. 3 and 4, the intersection of the outside beveled surface 34 with the blunt end surface 30 forms a chord indicated at 40 in FIG. 4. This chord 40 is located at a distance "a2" from the outside surface of the leg 18. The dimension "a2" is in the range of 0.15 to 0.4 of the diameter "d" of the wire.

We have found that a staple made according to the above dimensions provides optimal insertion of the staple into the metal sheets and spreads the legs in a manner to obtain optimal retention of the staple and accordingly optimal attachment together of the metal sheets.

Figure 5:
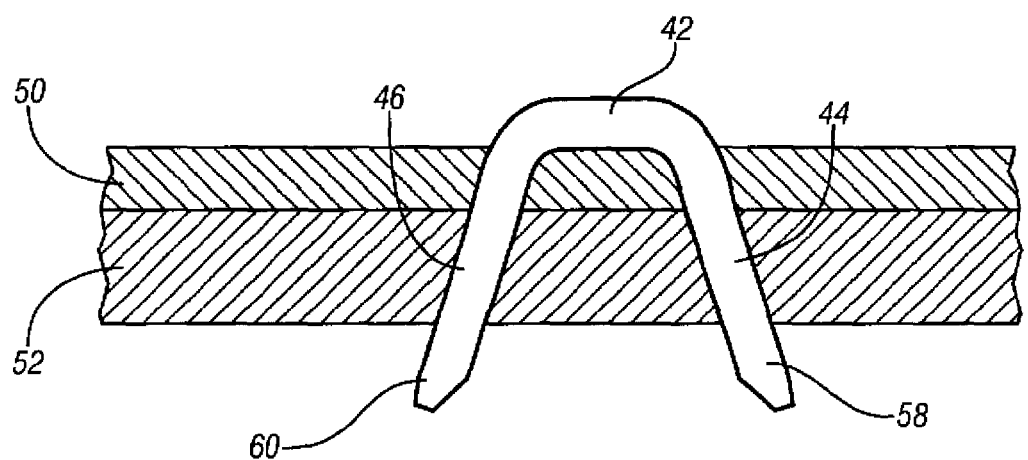
FIG. 5 is a view similar to FIG. 2 but showing a staple having legs of greater length than the staple of FIGS. 1 and 2.

FIG. 5 shows a staple 42 which is the same as the staple of FIGS. 1 through 4 except that the legs 44 and 46 of the staple 42 are of greater length than the combined thickness of top metal sheet 50 and lower metal sheet 52. Accordingly, as seen in FIG. 5, the metal piercing points 58 and 60 have passed completely through the lower sheet 52.

The foregoing description of the invention is merely exemplary in nature and, thus, variations thereof are intended to be within the scope of the invention. It will be understood that the manufacture of the staple may result in the rounding of the beveled surfaces and blunt end, and, nonetheless, allow the manufacture of the staple within the range of dimensions described herein. In addition the staple is not limited to use in attaching metal plates, but is also effective with polymer and composite materials.

What is claimed is:

1. A staple for attaching together first and second metal sheets comprising:

a length of round wire having a diameter in the range of 0.25 mm. to 2.0 mm., said wire being bent at the ends to form spaced apart depending metal legs;

each of the legs having a metal piercing point at the end thereof adapted to pierce completely through the first sheet and at least partially through the second sheet and also adapted to spread the legs further apart during the piercing to a spread position in which the legs are anchored within the metal sheets and thereby attach the metal sheets together, said metal piercing points each having an outside bevel surface on the outside of the leg, an inside bevel surface on the inside of the leg, and a blunt end surface between the inside and outside bevel surfaces, and wherein;

the inside bevel surface has an angle in the range of 45 degrees to 75 degrees from the blunt end surface, the outside bevel surface has an angle in the range of 60 degrees to 90 degrees from the blunt end surface, a chord formed at the intersection of the blunt end surface with the inside bevel surface is at a distance from the inside surface of the leg in the range of 0.15 to 0.5 of the diameter of the wire, and a chord formed at the intersection of the blunt end surface and the outside bevel surface is at a distance from the outside surface of the leg in the range of 0.15 to 0.4 of the diameter of the wire.

2. The staple of claim 1 further comprising the length of the legs being greater than the thickness of the topmost of the metal sheets, and less than the combined thickness of the metal sheets, so that the metal piercing point of the legs will pierce completely through the first sheet and only partially into the lower most of the metal sheets.

3. The staple of claim 1 further comprising the length of the legs being greater than the combined thickness of the metal sheets, so that the metal piercing point of the legs will pierce completely through both the metal sheets.

* * * * *